Feb. 24, 1959 — W. H. NORTON — 2,874,751
TEMPERATURE CONTROLLED PRESS
Filed March 13, 1956

Inventor
William H. Norton

United States Patent Office 2,874,751
Patented Feb. 24, 1959

2,874,751

TEMPERATURE CONTROLLED PRESS

William H. Norton, Chicago, Ill., assignor to Thermel, Inc., Chicago, Ill., a corporation of Delaware Application March 13, 1956, Serial No. 571,209

2 Claims. (Cl. 154—1)

The instant invention relates to molding apparatus, and more particularly, to an improved hot press.

Although the invention may have application in a number of fields, it is particularly useful in the molding of large laminated articles, the general type comprising fibrous reinforcing elements in a resinous matrix, and the invention will be described particularly with respect to this use. In the molding of large laminated articles, relatively high pressures and temperatures are applied to the resin impregnated fibrous material in order to insure uniform distribution of the resin throughout the material prior to the curing thereof. In the case of large laminated articles, the molds employed are substantial in size and substantial bodies of metal or similar structural material which define the platens in the mold, must be heated to the molding temperature then cooled to a satisfactory temperature for the removal of the molded laminate. The heating and cooling of such large platens, of course, requires an appreciable amount of time; and one of the biggest disadvantages of such molding techniques is the time required for an individual molding cycle. Also, a rather substantial amount of heat is lost each time the large platens are cooled down and such heat must then be imparted again to the platens in order to bring the platens up to the desired molding temperature.

The instant invention affords a novel method of speeding up the molding cycle and avoiding the rather substantial heat losses which now occur. In the practice of the instant invention, lightweight thin face pieces are provided for the platen members and these face pieces define the mold (or cavity). Such lightweight face pieces are urged into surface-to-surface contact with the main platen members when the mold is in closed position and the face pieces as well as the platen members are heated up to the molding temperature. When the molding of the laminate is completed, the platen members are separated and resilient means simultaneously separate the face pieces from the platen member associated with each, so that the main platen member in each case may retain substantially its molding temperature, while the individual face pieces may be rapidly cooled (having much less mass than the platen members) and the molded article may be removed from the mold much more quickly. The cooling of the molded article is greatly accelerated, because normal cooling means in the form of fluid receiving conduits within the face pieces may very rapidly cool such a small mass of metal, whereas ordinary cooling means cannot cool the rather substantial mass of metal which forms the main platen members at a comparable rate. Also, the heat of the main platen members need not be lost with each cooling cycle, so that heating up of the main platen members to the molding temperature, as a subsequent step in the cycle, is substantially eliminated and heating only of the thin face pieces is required.

It is, therefore, an important object of the instant invention to provide an improved hot press structure.

It is a further object of the instant invention to provide an improved molding press, which comprises a plurality of platen members, a mold-defining thin face piece carried by each member, press means moving the platens and associated face pieces in and out of mold-defining relationship, resilient means interposed between each platen and associated face piece yieldable to afford surface-to-surface contact between each platen and associated face piece when in mold-defining relationship but maintaining spaced relationship between each platen and associated face piece when the same are out of mold-defining relationship, primary temperature control means connected to the platens, and secondary temperature control means connected to the face pieces.

Other and further objects, features and advantages of the present invention will become apparent to those skilled in the art from the following detailed disclosure thereof and the drawings attached hereto and made a part hereof.

Figure 1:
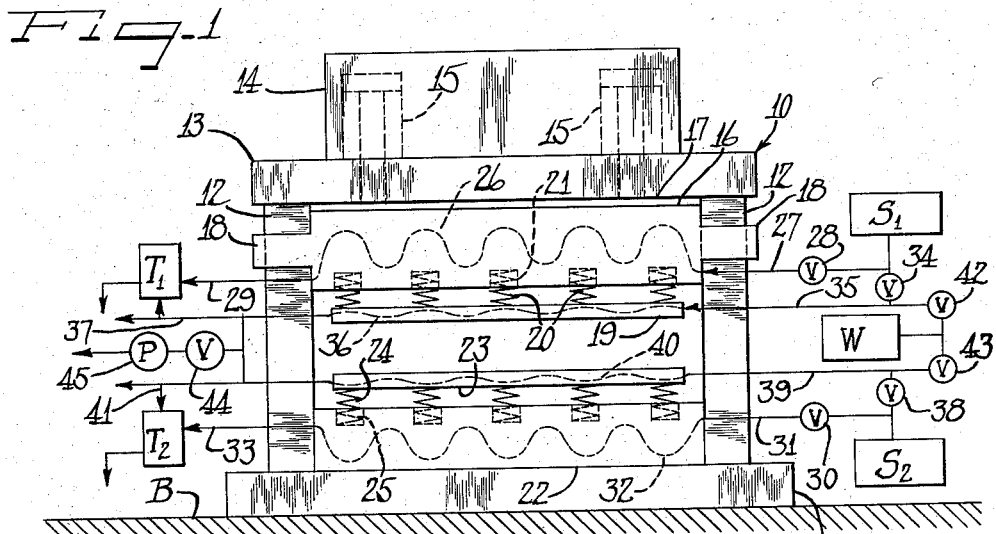
Figure 1 is a side elevational view of a molding press embodying the instant invention, with parts shown diagrammatically.

In Figure 1, the molding press indicated generally by the reference numeral 10 is mounted on a press bed B or similar permanent structure. A die set 11 forms the bottom foundation member secured to the press bed. As will be appreciated, the die set 11 is a generally rectangular member in plan view and mounts near the corners thereof four vertically extending frame members (only two of which 12, 12 are shown in the drawing) which support an upper frame 13 which is also generally rectangular in plan view. The frame 13 is mounted in generally horizontal plane and carries thereon a press ram housing 14, having a pair of hydraulically actuated pistons 15, 15 housed therein.

An upper movable platen member 16, having an insulator block 17 affixed to the top thereof is operatively connected to the bottoms of the movable pistons 15, which provide the power for moving the platen member 16 up and down, in and out of mold-defining relationship. Guides 18, 18 mounted on the movable platen member 16 cooperate with the vertical support members 12, 12 to keep the movable platen 16 in proper alignment during its movement up and down. As here shown, the guides 18 are in the form of rings encircling the upright support members 12 and slidably received thereby, but any of a number of well known guide arrangements may be employed.

As will be seen, the platen member 16 is of rather substantial size or mass. A thin relatively lightweight face piece 19 is carried at the bottom of the platen 16 by resilient means in the form of springs 20, which in the normal open position of Figure 1 carry the face piece 19 in spaced relation from the bottom of the platen 16. As is indicated best in Figure 2, the springs 20 are mounted in individual recesses 21, which are of sufficient size to receive the entire spring 20 when adequate force is applied against the face piece 19 to urge the same into surface-to-surface contact with the bottom of the platen 16. When no force is applied against the bottom of the platen 16, the springs 20 are sufficiently resistant to extension to carry the weight of the face piece 19.

Figure 2:
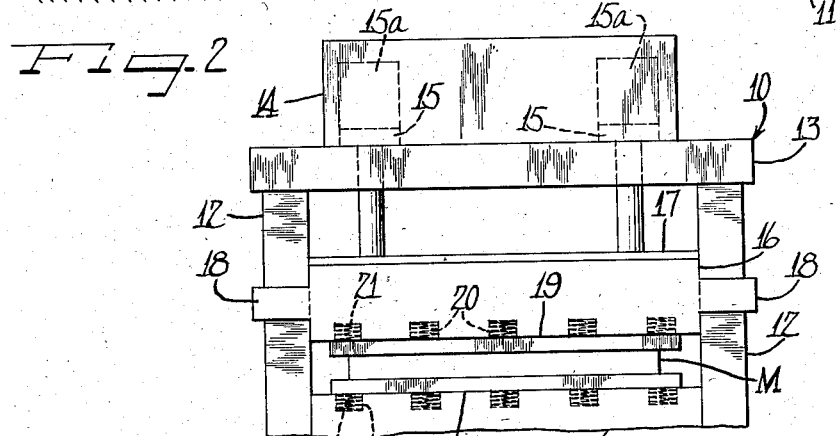
Figure 2 is a fragmentary elevational view of the molding press of Figure 1 showing certain parts in a different position for a different time in the molding cycle.

Referring now to the bottom portion of the press 10, it will be seen that a lower fixed platen member 22 is securely mounted on the die set 11 directly beneath the movable platen 16. The lower platen 22 is of substantially the same size in mass as the upper platen 16, whereas a relatively thin lightweight mold-defining lower platen face piece 23 is carried above the lower platen 22 on resilient means in the form of springs 24, likewise, mounted in recesses 25 which are of sufficient size to receive the entire spring 24 in compressed position. The springs 25 are of sufficient strength to lift the lower face piece 23 and maintain the same in the normal "open mold" position of Figure 1 in spaced relation from the top of the lower platen member 22. When the springs 25 are completely compressed, the face piece 23 is forced into surface-to-surface contact with the top of the lower platen member 22 (as best shown in Figure 2).

The upper platen member 16 is provided with suitable main or primary temperature control means in the form of heat exchange fluid receiving conduits indicated diagrammatically at 26 within the body of the platen member 16 and a flexible conduit 27 connected thereto and communicating through a valve 28 with the source of steam under pressure $S_1$. Steam is controllably fed through the valve 28 and the flexible conduit 27 (which permits movement of the platen 16 without being disconnected) and through the conduits 26 within the platen member 16. Condensate is removed from the conduits 26 through a condensate line 29 which feeds into a trap $T_1$. In like manner, primary heating means are provided for the lower platen member 22, whereby steam is fed from a source of steam under pressure $S_2$, through a valve 30, a flexible conduit 31, fluid receiving conduits 32 within the body of the platen member 22 and then out through a condensate line 33 and into a second trap $T_2$. It will be appreciated that other heating means may be employed for the platen members 16 and 22, but steam heating of platens is one way and it is well understood in the art and need not be further described herein.

It will further be noted that heating of the face piece 19 may also be carried out, if desired, by passing steam through a valve 34 connected to the first source of steam $S_1$, a flexible conduit 35, fluid exchange receiving conduits (shown diagrammatically at 36) in the face piece 19 and then out through a condensate line 37 into the first trap $T_1$. Similarly, steam may be fed from the second source of steam $S_2$ through a valve 38 into a flexible conduit 39, through fluid exchange receiving conduits 40 in the lower face piece 23, and then out through a condensate line 41 and into the second trap $T_2$. Again, the use of fluid exchange receiving conduits 36 and 40 in platen elements such as the face pieces 19 and 23 will be well understood by those skilled in the art and need not be further described herein. In view of the thinness of the face pieces 19 and 23 a more simplified conduit pattern would be used than in the case of the larger platen members 16 and 22.

When it is desired to cool the face pieces 19 and 23 the valves 34 and 38 are closed and cooling water from a suitable source W is used. The cooling water may flow through a valve 42, the flexible conduit 35, the fluid exchange receiving conduits 36 within the face piece 19 then out through the previously mentioned condensate line into a sewer. The valving arrangement with respect to the condensate line will also be obvious to those skilled in the art and need not be described in further detail. In like manner, cooling water may flow from the source W through a valve 43, the flexible conduit 39, the fluid exchange receiving conduits 40 in the face piece 23 and then out through the condensate line 41, either to the sewer or even to the trap $T_2$.

As an alternative, the cooling water flowing through the face pieces 19 and 23 may be drawn off through a valve 44 and a pump 45 to a sewer. This arrangement is preferred at the end of the cooling step in the cycle, so that water will be removed from the fluid exchange conduits 36 and 40 just before heating of the face pieces 19 and 23 as the next step in the molding cycle.

Referring now to the details of the molding cycle, Figure 1 shows the position of the various mold elements at the startup of the cycle. In this arrangement the face pieces 19 and 23 are maintained in spaced relation from the platens 22 and 16. As will be appreciated, the face pieces 19 and 23 have opposed mold-defining faces, which are here shown merely as flat surfaces, although it will be appreciated that such mold-defining face pieces 19 and 23 may have opposed curved or otherwise configurated faces. The next step in the cycle involves positioning molding material M between the face pieces 19 and 23 and then closing the mold to the position shown in Figure 2.

As will be seen in Figure 2, the press pistons 15, 15 have moved downwardly. The operation of hydraulic pistons for actuating mold platens is well understood in the art and need not be described in further detail, and it is sufficient to note that hydraulic fluid is forced under pressure into the chamber 15a above each of the pistons 15, 15 so as to force the same downward. Downward movement of the pistons 15, 15 moves the platen member 16 downward and compresses the springs 20 supporting the face piece 19 as well as the springs 20 for supporting the face piece 23, so that the face pieces 19 and 23 have been moved into surface-to-surface contact with the platen members 16 and 22, respectively. At this stage in the molding cycle, the platen members 16 and 22 are already substantially at the molding temperature, because it was not necessary to cool the platen members 16 and 22 down during the previous cycle. The face pieces 19 and 23 have, however, been cooled by the use of the cooling water, in the manner hereinbefore described (and preferably evacuated through the pump 45) so it is necessary to heat the face pieces 19 and 23 up to molding temperature. This can be accomplished merely by conduction heating from the heat sources afforded by the mass of the upper and lower platen members 16 and 22, but preferably steam is fed into the face pieces 19 and 23 to accelerate heating thereof. As previously indicated, steam is fed through the valves 34 and 38 (shown in Fig. 1) and the molding temperature is then reached quickly. The press 10 is then retained in closed position with full pressure applied through the pistons 15, 15 until the molding or curing of the material M is completed. In the case of laminates, relatively high pressure is desirable in order to assure complete impregnation of the fibrous material with the resinous material. The resinous material initially is fluidized by the application of pressure and temperature and then usually cures (as is in the case of thermosetting resins), in order to complete the cycle. In any event when the molding of the material M is completed, the movable platen member 16 is moved upwardly a sufficient distance to permit the resilient members 20 and 24 to urge the face pieces 19 and 23 into spaced relation from the platen members 16 and 22, respectively.

Figure 3:
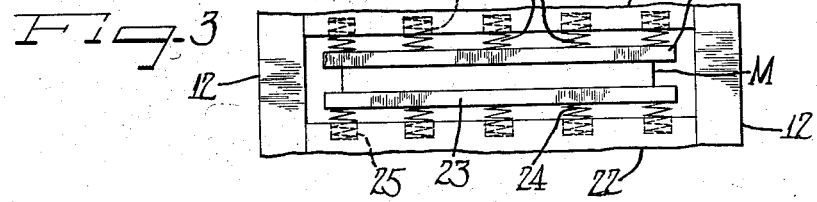
Figure 3 is another fragmentary elevational view of the molding press of Figures 1 and 2 showing still another position of the platen members.

Preferably, this results in positioning the elements as shown in Figure 3. In Figure 3, the platen member 16 has been moved upwardly away from the platen member 22 a distance sufficient to permit the springs 20 to urge the face piece 19 away from the bottom of the platen member 16 and also sufficient to permit the springs 24 to urge the face piece 23 up from the top surface of the platen member 22. The springs 20 and 24 are, however, preferably still under compression so that the face pieces 19 and 23 press tightly against the molded material M. This arrangement prevents any tendency toward deformation in the molded material during cooling. In such an arrangement the cooling water is then fed through the face pieces 19 and 23 in the manner hereinbefore described so as to rapidly cool the face pieces 19 and 23 (much more rapidly than could be accomplished if the face pieces were retained in surface-to-surface contact with the platen members 16 and 22). Such rapid cooling of the molding material is advantageously used to obtain desired surface characteristics in the case of a number of different molding materials. In addition, the time spent in the cooling step is materially reduced. Once this cooling step has been completed, the platen member 16 is then moved the rest of the way up to the position shown in Figure 1, the molding material M is removed, and a new portion of molding material is placed between the face pieces 19 and 23.

As a typical example of the structural relationship here involved, in a 30 inch by 30 inch press (i. e. having face pieces 19 and 23 with opposed faces that are 30 inches by 30 inches) the pistons 15, 15 are capable of delivering a total of 350 tons pressure. The springs 20 and 24 are capable of resisting a pressure of 150 tons urged against either of the face pieces 19 or 23. In this way the pistons 15, 15 are sufficient to overcome the springs 20 and 24, when desired, so that the springs 20 and 24 may yield to the pistons 15, 15 to arrive at the closed position shown in Figure 2. The springs 24, 20 will be capable of applying a substantial amount of pressure through the face pieces 19 and 23 during the cooling cycle, such as desired, in the position shown in Figure 3. In general, the face pieces 19 and 23 are of substantially the same area as the platen members 16 and 22 and they differ only in thickness. Preferably, the thickness of the face pieces 19 and 23 is 10% to about 40% of the thickness of the platen members 16 and 22. The springs 20 and 24 are relatively high strength springs which actually move the face pieces 19 and 23 only a short distance (of perhaps ¼ inch) away from the platen members 16 and 22, since only a short space is required in order to have an effective air insulation between the elements. In addition, springs 20 and 24 are preferred as resilient means, because such springs 20, 24 permit the face pieces 19 and 23 to float or ride freely thereon. This is desirable because of the expansion and contraction of the face pieces 19 and 23 during the heating and cooling cycle, while there is substantially no change in the dimensions of the platen members 16 and 22.

It will be understood that modifications and variations may be effected without departing from the spirit and scope of the novel concepts of the present invention.

I claim:

1. In a molding press, an upper movable platen member, a thin mold-defining upper platen face piece, upper resilient means carried by the upper platen member and normally carrying the upper face piece in spaced relation therefrom, a lower fixed platen member, a thin mold-defining lower platen face piece, lower resilient means carried by the lower platen member and normally holding the lower face piece in spaced relation therefrom, press means selectively moving the platens and face pieces into open and closed mold-defining relationship, both said resilient means being yieldable to said press means to accommodate surface-to-surface contact between each platen member and the face piece carried thereby in closed mold-defining relationship, heating means for said platen members, and cooling means and heating means connected to said face pieces.

2. In a molding press, an upper movable platen member, a thin mold-defining upper platen face piece, upper resilient means carried by the upper platen member and normally carrying the upper face piece in spaced relation therefrom, a lower fixed platen member, a thin mold-defining lower platen face piece, lower resilient means carried by the lower platen member and normally holding the lower face piece in spaced relation therefrom, press means selectively moving the platens and face pieces into open and closed mold-defining relationship, both said resilient means being yieldable to said press means to accommodate surface-to-surface contact between each platen member and the face piece carried thereby in closed mold-defining relationship, heating means for said platen members, fluid exchange receiving conduits in said face pieces, a source of heating fluid connected to said conduits, and a source of cooling fluid connected to said conduits.

References Cited in the file of this patent

UNITED STATES PATENTS

| | | |
|---|---|---|
| 1,949,275 | Heintz | Feb. 27, 1934 |
| 2,248,499 | Heintz | July 8, 1941 |
| 2,431,943 | Land et al. | Dec. 2, 1947 |
| 2,532,501 | Johnson | Dec. 5, 1950 |
| 2,638,964 | Andina | May 19, 1953 |
| 2,791,265 | Rolaston et al. | May 7, 1957 |